United States Patent Office 2,838,374
Patented June 10, 1958

2,838,374

PROCESS FOR THE PRODUCTION OF SODIUM SULPHIDE

Heinz Beyer, Koln-Stammheim, Germany, assignor to Farbenfabriken Bayer Aktiengesellschaft, Leverkusen, Germany, a corporation of Germany No Drawing. Application June 27, 1956
Serial No. 594,104

Claims priority, application Germany June 29, 1955

2 Claims. (Cl. 23—134)

This invention relates to a process for the production of anhydrous sodium sulphide which is free from iron.

No commercial process for the production of sodium sulphide containing neither water nor iron is known. The commercially available sodium sulphide is in every case produced by reduction of sodium sulphate, usually by means of carbon, but also by means of hydrogen and other reducing gases. Reduction with carbon yields a crude melt, which contains, in addition to sodium sulphide, considerable amounts of impurities and by-products, such as unreacted carbon, ash constituents and impurities from the carbon, carbonates, sulphites, sodium thiosulphates and iron compounds. This crude melt is usually extracted with water, so that the water-soluble part of the impurities and considerable amounts of iron pass into the extraction liquor. Other reactions take place subsequently in the aqueous solution, and these lead to undesirable by-products. By evaporating the extraction liquor, either crystals of the composition $Na_2S.9H_2O$ are obtained or, with further evaporation, a product containing 60% of $Na_2S$ solidifies from the melt. Both hydrates, namely the hydrate crystallising from the solution and containing 32% of $Na_2S$, and also in particular the hydrate solidified from the melt and containing 60% of $Na_2S$, contain considerable amounts of soda, sulphite, thiosulphate, sulphate and iron salts. The commercially available substance containing 60% $Na_2S$ is coloured a dark reddish brown by the iron and can scarcely be used for certain purposes, such as for example the treatment of textiles. It is not technically or economically possible to reduce the residual 40% of water content by further evaporation on account of the extraordinarily steep rise in the melt temperature above 60% of $Na_2S$ and since a suitable material for use in making the necessary apparatus which is resistant to concentrated sodium sulphite melt is unknown. Even evaporation to only 60% of $Na_2S$ necessitates the use of apparatus made from expensive special alloys or causes heavy wear on other materials.

It is true that commercial anhydrous sodium sulphite has already been produced, namely, by reduction of sodium sulphate with hydrogen; however, the use of hydrogen represents a considerable additional expense, both economically as compared with the inexpensive carbon and also, from an apparatus point of view, as regards the sealing of the reaction furnace against admission of air and also against egress of hydrogen. However, this process still always produces a substance containing iron, even if no iron catalyst is added to the sulphate, since the sodium sulphate which is available technically already introduces at least enough iron to produce discoloration when using the sulphide obtained therefrom.

A process has now been discovered for obtaining a sodium sulphide of excellent purity by reduction of sodium sulphate with carbon or other reducing agents, which sulphide is in particular free from iron and water. The process is based on the fact than anyhdrous sodium sulphide, unlike the hydrate, dissolves readily in alcohols.

It has been found that 160 gr., i. e. 2.05 mols of $Na_2S$, of anhydrous sodium sulphide is dissolved by 1 litre of methanol at 20° C., whereas corresponding solubility of the monohydrate is only 30 g., i. e. 0.12 mol of $Na_2S.9H_2O$. The process based on this fact consists in that after reduction of sodium sulphate, carried out in a manner known per se, for example with carbon, the crude melt thus obtained is extracted with an alcohol and the extract is evaporated to dryness after filtration. If the extraction agents and the crude melt are not sufficiently anhydrous, the water remains with a correspondingly small proportion of the sodium sulphide in the residue. The extraction agent recovered by condensation and used again for the process is thus rendered anhydrous while being used for the first time. Obviously, the high sodium sulphide concentration represses almost entirely the smaller solubility of the hydrate according to the law of mass action. The sodium sulphide obtained by evaporating the extraction agent does not contain either water or iron, or sulphite, sulphate or thiosulphate. It is only sodium carbonate which may be present in amounts up to 5%, in addition elementary sulphur where such is contained in the crude melt and is soluble in the alcohol which is used.

Other aliphatic or aromatic alcohols and also polyhydric alcohols are suitable as extraction agents in addition to methanol. For example, it has been shown that 90 g. of $Na_2S$ can be dissolved in 1 litre of ethanol, 31 g. in 1 litre of isobutyl alcohol, more than 40 g. in 1 litre of benzyl alcohol, and more than 200 g. in 1 litre of ethylene glycol. The saturation in glycol is still not reached with 200 g. of $Na_2S$ per litre, but concentrated solutions can no longer be filtered by simple means owing to the greatly increased viscosity. When using high-boiling alcohols, it is expedient to carry out the evaporation of the extract in vacuo in order to avoid formation of mercaptan, although this formation is still only very slight even in glycol at a temperature of 197° C., the boiling point of glycol at atmospheric pressure, and consequently does not appreciably impair the yield.

Apart from the advantage of excellent purity, another advantage of the anhydrous product is the low economic expenditure for storage and conveyance. As compared with the aqueous extraction, the process also provides higher yields, because the extraction residue can be washed out more thoroughly with alcohols, for example methanol, than in the hitherto usual method with water, in which the swelled residue persistently retains sodium sulphide. Adhering alcohol is recovered in a substantially complete manner by evaporating and condensing the vapour.

It has further been shown that the solution of sodium sulphide in alcohol does not attack iron, so that ordinary steel can be used as the material for the apparatus. On the other hand, the concentration of an aqueous sodium sulphide solution necessitates expensive metals which can only be machined with difficultly, namely, cast iron, which has only limited durability, nickel or alloys with a high nickel and chromium content.

Finally, it is to be emphasised that since the specific heat of evaporation of an organic solvent, amounts to half or less than that of water, the energy required for the complete removal by evaporation of an organic solvent from a solution containing 10 to 20% of sodium sulphide is no greater than that needed for increasing the concentration by evaporation of the usual aqueous solution containing 20–30% $Na_2S$ a value of 60% $Na_2S$. For example, a methanol solution saturated at 20° C. contained 16.5% of $Na_2S$; disregarding the heat of solution which is similar to that of an aqueous liquor, it can easily be calculated that 100 kg. of pure $Na_2S$ are to be obtained therefrom with a consumption of 135,000 kcal., that is to say, with the same amount of energy as is required to obtain 100 kg. of $Na_2S$ associated with 67 kg. of residual $H_2O$ from an aqueous solution containing 24% of $Na_2S$.

This invention is illustrated by the following example without being restricted thereto.

Example 2 litres of methanol are poured over 430 g. of a crude melt in lump form (obtained by reduction of sodium sulphate with carbon) with a content of 75.5% of $Na_2S$, and the mixture is heated while stirring for two hours under reflux. After completing the extraction, the solution and residue are separated on a pressure filter. The clear yellowish solution has a specific gravity of 0.94 and contains 155 g. of $Na_2S$ per litre. It is evaporated to complete dryness with recovery of the alcohol. 320 G. of a finely crystalline substance with 94.80% of $Na_2S$, 2.00% of $Na_2CO_3$ and 3.20% of sodium trithiocarbonate are obtained. The residue obtained on the pressure filter is suspended in approximately 300 cc. of methanol, stirred and filtered. In the second extraction, 11.1 g. of $Na_2S$ are dissolved. This very dilute solution is used in another extraction process instead of fresh solvent. The second filter residue still contains approximately 18% of methanol in the filter cake, and this methanol is driven off by heating to 70° C. and recovered. The dry residue finally contains 7.9 g. of $Na_2S$. The yield of $Na_2S$ is accordingly 97.6%.

I claim:

1. In a process for the production of pure anhydrous sodium sulfide free from iron, the step which comprises heating the melt obtained by reduction of sodium sulfate with carbon and which contains impurities resulting from the reduction process, with an alcohol, filtering the sodium sulfide solution thereby formed and recovering the sodium sulfide from the said solution by evaporating the alcohol.

2. A process according to claim 1, wherein the alcohol used is methanol.

References Cited in the file of this patent

UNITED STATES PATENTS 2,344,001    Robinson _____ Mar. 14, 1944

FOREIGN PATENTS 284,958    Great Britain _____ Feb. 9, 1928